June 16, 1936.  J. DUNLOP  2,044,158
CHAIN GEAR
Filed April 12, 1934
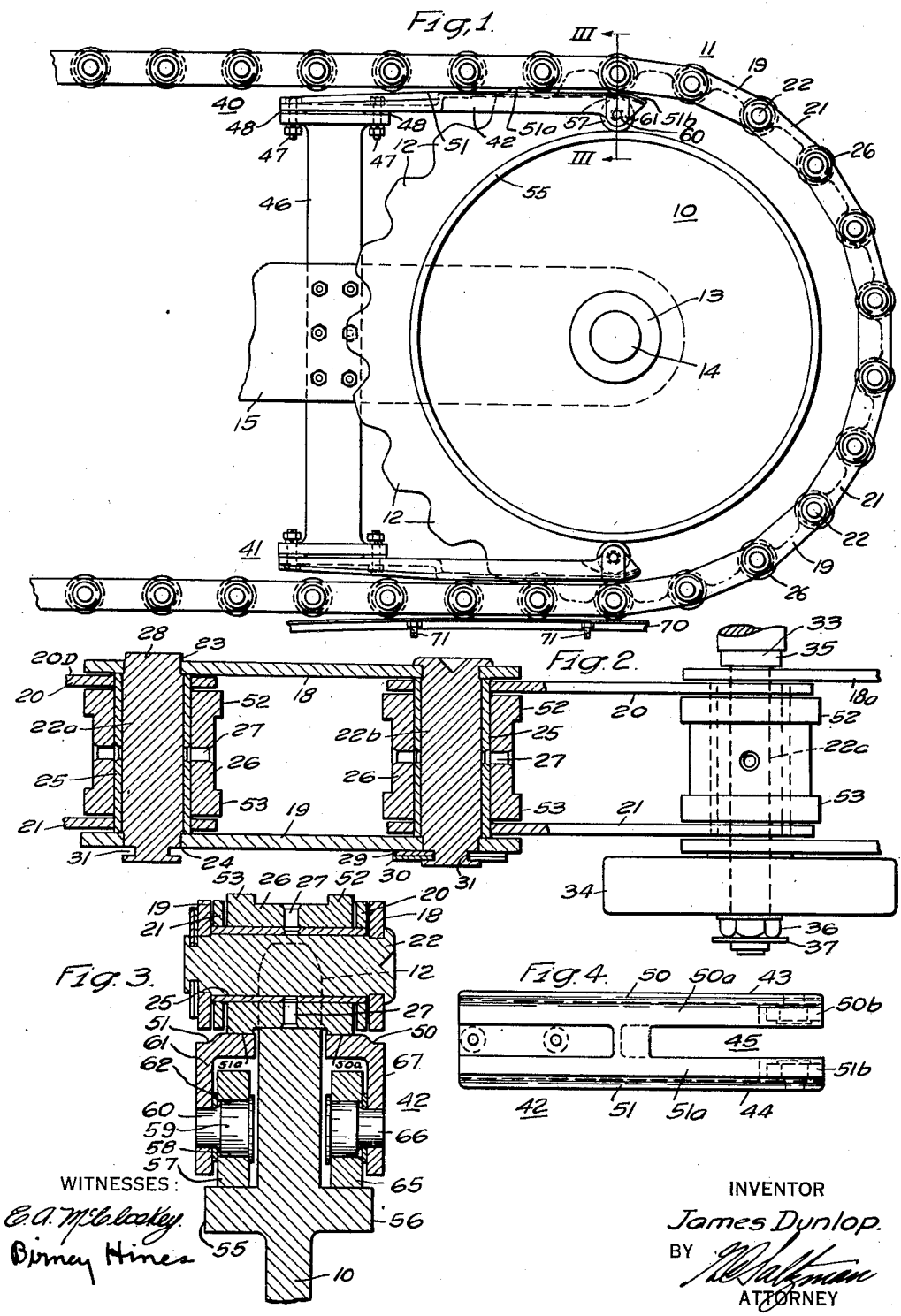
WITNESSES:
INVENTOR
James Dunlop.
BY
ATTORNEY Patented June 16, 1936

2,044,158

UNITED STATES PATENT OFFICE 2,044,158

CHAIN GEAR

James Dunlop, Park Ridge, Ill., assignor to Westinghouse Electric Elevator Company, Chicago, Ill., a corporation of Illinois Application April 12, 1934, Serial No. 720,222

7 Claims. (Cl. 74—240)

My invention relates to chain gears and more particularly to chain gears comprising sprocket wheels and sprocket chains such as are usually employed for operating moving stairways or inclined elevators.

Moving stairways are usually installed in department stores, railway stations and other buildings in which large numbers of persons are to be transferred from one floor to another. Obviously, it is desirable to have such moving stairways operate as quietly as possible. In the majority of moving stairways, the steps or treads are driven by chain gears comprising a pair of sprocket chains supported upon and driven by a plurality of large sprocket wheels. Usually the chains are provided with rollers for engaging the teeth of the sprocket wheels and they are otherwise constructed as carefully as possible to prevent any undue noise in their operation. However, in spite of careful construction of the chains, it has been found that the impact between the chain rollers and the sprocket wheels when in operation usually produces a very objectionable noise.

Therefore, one of the objects of my invention is to reduce the amount of noise that is usually incident to operation of the sprocket wheels and their sprocket chains in driving moving stairways.

Another object is to reduce the shock and wear usually caused by the impact of the chain and sprocket wheel at the points where the chain engages the wheel and where it leaves the wheel.

A further object is to provide, in a chain gear, for maintaining an unvarying velocity of the moving chain as it enters and leaves the sprocket wheels with which it is associated.

It is also an object to provide a practically noiseless chain gear that may be easily and economically manufactured, installed and maintained in operation.

Other objects of my invention will in part be obvious and will, in part, appear hereinafter.

For a better understanding of the invention, reference may be had to the accompanying drawing, in which, Figure 1 is a view, in side elevation, of a sprocket wheel and a portion of a sprocket chain driven thereby for operating a moving stairway;

Fig. 2 is a top plan view, partly in section, of a portion of the chain shown in Fig. 1;

Fig. 3 is an enlarged view taken on lines III—III of Fig. 1, and,

Fig. 4 is a top plan view of the upper tangential chain guide included in Fig. 1.

Referring more particularly to the drawing, I have illustrated a sprocket wheel 10 for driving a sprocket chain 11, only a small portion of which is shown. The sprocket wheel 10 is provided with the usual sprocket teeth 12 and is rotatably mounted, by means of a bushing 13 and an axle 14, upon a frame 15, only a small portion of which is shown. The sprocket wheel illustrated herein may be driven by any suitable means (not shown) or it may be an idler sprocket wheel for supporting only one end portion of the sprocket chain.

The chain 11 comprises a plurality of outer links 18 and 19, a plurality of inner links 20 and 21 and a plurality of cross pins 22. Referring more particularly to Fig. 2, the pin 22a shows how each of the pins 22 is first constructed with its ends provided with peripheral grooved surfaces 23 and 24 upon which the ends of the links 18 and 19 may be mounted. The grooved surfaces 23 and 24 should be of such size that they will make what is known as a press fit with cooperating holes in the links 18 and 19 and thereby cause the pins and the links to freeze and turn or act as one body.

A bushing 25 is rotatably mounted upon the pin 22a and the inner links 20 and 21 are mounted upon the ends thereof by means of a press fit so that the bushing freezes to the inner links and rotates and moves with them. A chain roller 26 is rotatably mounted upon the bushing 25 for the purpose of engaging the sprocket wheel teeth as the chain operates over the sprocket wheel. Suitable oil holes 27 are drilled in the roller 26 and also in the bushing 25 to permit the attendants to readily lubricate the chain roller and the bushing.

In assembling the chain, the roller 26 is first mounted upon the bushing 25 and then the inner links 20 and 21 are forced upon the outer ends of the bushing. The pin 22a is then placed within the bushing 25 and the outer links 18 and 19 are forced upon the outer ends of the pin, whereupon the upper end 28 of the pin is peened down against the outer link 18 and a pair of lock washers 29 and 30 are placed in the groove 31 in the lower end of the pin as shown in connection with pin 22b. The peening of the end 28 and the lock washers 29 and 30 prevent the pin from working out of its position in the links even if the press fits between the outer links and the pin and between the inner links and the bushing should work loose.

The chain may be connected to a moving stairway tread (not shown) in any suitable manner, as by boring a hole through the pin (as shown at pin 22c) and inserting through that hole a step or tread axle 33, only a small portion of which is shown. If desired, a supporting wheel 34 may be mounted upon the outer end of the axle 33 in any suitable position to cooperate in the support of the axle 33 and the moving stairway tread, not shown. A shoulder 35 is provided on the inner portion of the axle 33 to maintain the outer link 18a in correct position. A suitable nut 36 and lock washer 37 are disposed on the outer end of the shaft 33 to maintain the wheel 34 in position on the axle.

In order to reduce the noise usually caused by the impact of the chain rollers 26 against the teeth 12 as the chain passes over the wheel, I have provided an upper tangential chain guide 40 and a lower tangential guide 41.

As shown in Figs. 1, 3 and 4, the chain guide 40 comprises a channel iron shoe 42 having a pair of prongs 43 and 44 which provide a channel 45 through which the sprocket wheel teeth 12 may pass. The end of the guide shoe 40 opposite the end that straddles the wheel is mounted upon an upwardly extending portion 46 of the frame 15 by means of a plurality of bolts 47. A plurality of suitable shims 48 are disposed between the shoe and the support 46 for the purpose of adjusting the shoe to its best position with reference to the chain 11.

The upper portion of the shoe 42 is provided with slightly inclined tracks or surfaces 50 and 51, and practically level tracks or surfaces 50a and 51a which extend along the prongs 43 and 44 to provide suitable paths for the cooperating enlarged end portions 52 and 53 on the chain rollers. Near the ends of the prongs 43 and 44, the surfaces 50a and 51a pass into curved or inclined surfaces 50b and 51b.

When the chain is approaching a wheel provided with a guide shoe or cam 42 constructed as described, the inclined surfaces 50 and 51 will ease the enlarged portions 52 and 53 of the rollers 26 into quiet engagement with the substantially straight surfaces 50a and 51a and the rollers will roll along the surfaces 50a and 51a until the center portions of the rollers slip into proper position in the sprocket teeth without making any sudden impact therewith. In this manner, the engaging surfaces of the chain and the wheel flow into engagement with each other without causing an impact of one upon the other. Hence there will be no noise produced by the rollers of the moving chain striking the sprocket teeth.

Furthermore, the contact of the rollers on the guide shoe will start the rollers into rotation by the time they reach the sprocket teeth and this will make it unnecessary for the sprocket teeth to overcome any inertia of non-rotating rollers, thereby still further reducing any noise in the chain.

As shown, the rollers 26 look somewhat like spools and their enlarged outer ends 52 and 53 not only engage the tracks 50 and 51, but also act as shoulders which assist in keeping the chain centered on the sprocket wheel.

The curved surfaces 50b and 51b on the ends of the prongs 43 and 44 will aid in permitting the chain rollers to roll into position on the teeth and also present an inclined surface for the rollers to engage when the chain is moving in the reverse direction, if the guide shoes should become slightly out of adjustment.

In order to support and maintain each of the prongs 43 and 44 of the guide shoe 40 in their correct position with reference to the chain 11, I have provided a pair of angular tracks or shoulders 55 and 56, one upon each side of the sprocket wheel. These shoulders should be concentric with the axial center of the sprocket wheel. As shown in Figs. 1 and 3, the shoulder 55 provides a track for a roller 57 which is mounted by means of a roller bearing 58 upon the enlarged end 59 of a pin 60 mounted in the side 61 of the shoe 42. A washer 62 is mounted on the pin 60 adjacent to the wall 61 for the purpose of holding the roller 57 in correct position. The pin 60 is welded or otherwise firmly attached to the side wall 61 and is provided on its inner end with a head 61 which retains the roller 57 in operating position. The shoulder 56 provides a support for a roller 65 mounted upon a pin 66 in the side wall 67 of the shoe 42 in the same manner as the roller 57 is mounted in the side wall 61. It will thus be seen that, as the sprocket wheel 10 rotates, it provides a continuous track support for the free ends of the prongs 43 and 44.

The best results in using the guide shoe will be obtained by mounting it in such position that the center of the pin 60 will be in a plane passing through the axial centers of the pin 22 and the axle 14, as shown in Fig. 1.

The tangential guide 41 at the lower portion of the sprocket wheel is constructed and mounted in the same manner as the shoe 40. Therefore, no detailed description of it will be given.

A guide bar 70 is mounted opposite the guide shoe 41 at a point underneath the chain 11 to assist in guiding the chain as it enters or leaves the wheel. The guide 70 should be just close enough to engage the enlarged portions 52 and 53 of the chain rollers 26 as the chain leaves or enters the sprocket wheel, and its main guiding surface should be level and be in parallel with the tangent line at which the chain should leave the wheel. A plurality of bolts 71 are provided for adjusting the support 70 as desired.

Inasmuch as the main guiding surfaces of the guides 40, 41 and 70 are disposed in parallel with the tangent lines on which the chain should enter and leave the wheel, the various parts of the chain will be maintained in a straight line as they engage or leave the wheel and therefore will move at the same velocity.

In view of the foregoing description, it will be seen that I have provided a tangential guide for chain gears which reduces the noise or chatter usually caused by impact of the chain rollers or pins.

Although I have described and claimed only one specific embodiment of my invention, I am aware that many modifications thereof and changes therein may be made without departing from the spirit and scope thereof.

I claim as my invention:

1. In a chain gear, the combination with a frame, a sprocket wheel provided with an annular shoulder on each side concentric with its axial center, means for rotatably mounting the wheel on the frame, a sprocket chain comprising a plurality of links, a plurality of cross pins for connecting the links and a chain roller rotatably mounted on each cross pin, said chain being disposed in operative engagement with the teeth of the sprocket wheel, of a shoe provided with a pair of prongs on one of its ends for guiding the chain into engagement with the wheel, said prongs being disposed one on each side of the wheel, rollers rotatably mounted on the free ends of the prongs in position to travel on the annular shoulders to support the prongs, and means for mounting the other end of the shoe upon the frame.

2. In a chain gear, the combination with a frame, a sprocket wheel rotatably mounted on the frame and having an annular shoulder on each side concentric with its axial center, and a sprocket chain disposed in operative engagement with the wheel, of a shoe for guiding the chain in engagement with the wheel, said shoe having on one end prongs disposed to be supported by the annular shoulders on the wheel and thereby maintained in a predetermined guiding position, and means for supporting the other end of the shoe on the frame.

3. In a chain gear, the combination with a frame, a sprocket wheel rotatably mounted on said frame, an annular track associated with each side of the wheel and concentric with the axis of the wheel, a sprocket chain comprising a plurality of links, a plurality of cross pins for connecting the links, and a chain roller rotatably mounted on each cross pin, said chain being disposed in operative engagement with the teeth of the sprocket wheel, of a shoe provided with a pair of prongs on one of its ends for guiding the chain into engagement with the wheel, said prongs being disposed one on each side of the wheel, rollers rotatably mounted on the free ends of the prongs in position to travel on the tracks for supporting the prongs, and means for mounting the other end of the shoe upon the frame.

4. In a chain gear, the combination with a frame, a sprocket wheel rotatably mounted on said frame, and a sprocket chain disposed in co-operative engagement with said wheel, said chain comprising a plurality of side links, cross pins connecting the side links, and spool-like rollers having enlarged end portions, said rollers being disposed within the links and rotatably mounted on the cross pins, of a guide shoe mounted on the frame and having on its one end rigid prongs which extend along each side of the wheel and adjacent to the side of the chain approaching the wheel on a line approximately parallel to the tangential line of engagement of the chain on the wheel to a point on a straight line passing through the point of the tangential engagement of the chain and wheel and the axis of the wheel to provide a surface upon which the enlarged end portions of the rollers may ride in approaching the wheel and thereby prevent impact of the chain against the wheel before it reaches its tangential point of engagement with the wheel.

5. In a chain gear, the combination with a frame, a sprocket wheel rotatably mounted on said frame, and a sprocket chain disposed in co-operative engagement with said wheel, of a guide shoe mounted on the frame and having a free end extending along the side of the chain adjacent the wheel to approximately a straight line passing through the point of tangential engagement of the chain and wheel and the axis of the wheel to prevent impact of the chain on the wheel before it moves into tangential engagement therewith, and an annular track associated with said wheel and concentric with the axial center of the wheel for maintaining the free end of the guide shoe in its guiding position with reference to the chain.

6. In a chain gear, the combination with a frame, a sprocket wheel rotatably mounted on said frame and a sprocket chain disposed in co-operative engagement with said wheel, said chain comprising a plurality of links, cross pins for connecting the links and rollers rotatably mounted upon the cross pins, of a guide shoe having its one end mounted on the frame and its other end provided with a pair of prongs which straddle the teeth of the wheel and extend along the side of the chain approaching the wheel to approximately a straight line passing through the point of tangential engagement of the chain and wheel and the axis of the wheel to prevent impact of the rollers against the wheel before they reach approximately the tangential point of engagement of chain and wheel, and an annular track associated with each side of the wheel and being concentric with the axial center of the wheel for maintaining said prongs in their guiding position during operation of the sprocket wheel and chain.

7. In a chain gear, the combination with a frame, a sprocket wheel rotatably mounted on said frame and a sprocket chain disposed in co-operative engagement with said wheel, said chain comprising a plurality of links, cross pins for connecting the links and rollers disposed within the links and rotatably mounted upon the cross pins, of a guide shoe having its one end mounted on the frame and its other end provided with a pair of prongs which straddle the wheel and extend along the side of the chain approaching the wheel to approximately a straight line passing through the point of tangential engagement of chain and wheel and the axis of the wheel to prevent impact of the rollers against the wheel before they arrive at their point of tangential engagement, and means for maintaining the free ends of the prongs at a fixed distance from the axial center of the wheel.

JAMES DUNLOP.